B. C. SWINEHART.
SECTIONAL TIRE.
APPLICATION FILED APR. 20, 1912.

1,045,214.

Patented Nov. 26, 1912.

Witnesses:
Floyd E. Shannon
G. L. McClintock

Inventor,
Benjamin C. Swinehart
by
C. E. Humphrey
Atty.

UNITED STATES PATENT OFFICE.

BENJAMIN C. SWINEHART, OF YOUNGSTOWN, OHIO.

SECTIONAL TIRE.

1,045,214.   Specification of Letters Patent.   Patented Nov. 26, 1912.

Application filed April 20, 1912. Serial No. 692,082.

*To all whom it may concern:*

Be it known that I, BENJAMIN CLIFFORD SWINEHART, a citizen of the United States, residing at Youngstown, in the county of Mahoning and State of Ohio, have invented new and useful Improvements in Sectional Tires, of which the following is a specification.

This invention relates to improvements in elastic tires of the block tread type and the object thereof is, broadly speaking, to provide new and improved means for detachably holding the several bodies of resilient material securely in position on the rim of a vehicle wheel.

More specifically, my invention contemplates the provision of a plurality of block-carrying plates or "shoes," as they are known in the art, each of which is fashioned to hold one or more tire-forming blocks, and so constructed as to be readily applied to the outer face of the rim or felly-band of a wheel of standard construction and easily removed therefrom to permit the renewal of a worn or damaged block when necessary.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

Figure 1:
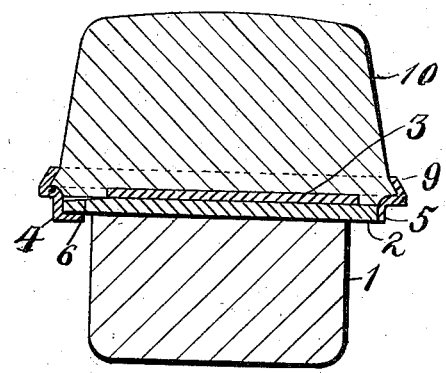
Figure 2:
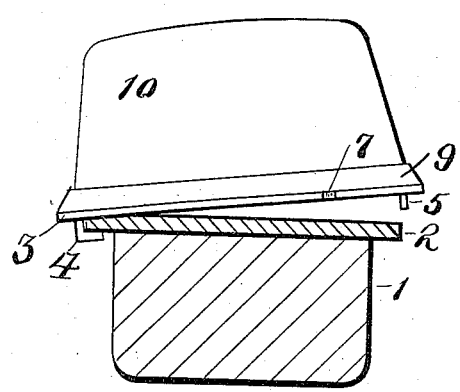
Figure 3:
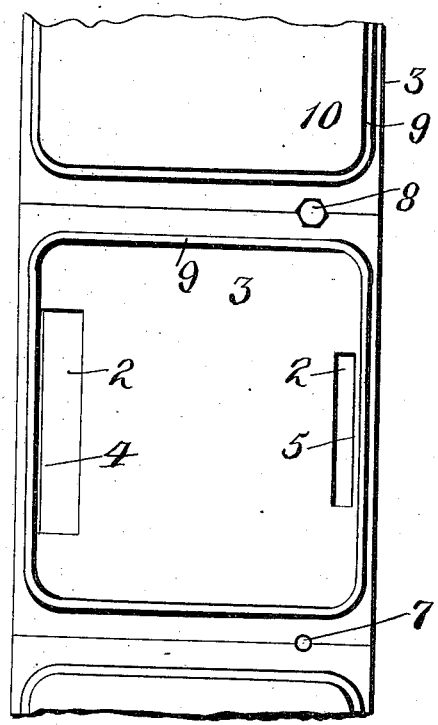

In the drawings in which similar reference numerals indicate like parts in the different figures, Figure 1, is a view in transverse section of the rim portion of a vehicle wheel showing also in section a tread-forming block mounted on a "shoe" embodying this invention and with the fastening means thereof shown in operative relation with the felly-band; Fig. 2, is a view similar to Fig. 1 showing the "shoe" in end elevation and in the position being seated upon the felly-band; and, Fig. 3, is a plan of a portion of a vehicle wheel equipped with "shoes" such as are shown in Figs. 1 and 2.

Referring to the drawings in detail the reference numeral 1 indicates the felly of a vehicle wheel on which is mounted the usual felly-band 2 which customarily projects laterally beyond the side faces of the felly as shown. Mounted on the outer face of the felly-band 2 are a plurality of members hereinafter referred to as "shoes" with the ends thereof substantially abutting and extending circumferentially around the wheel, and as these "shoes" are all alike a description of one is thought to be sufficient.

Each "shoe" embodies a base portion 3 consisting of a plate preferably of metal, of a width slightly exceeding the width of the felly-band 2 and a length varying with the circumference of the felly-band, so that the length of each "shoe" will under ordinary circumstances occupy a fractional portion of the outer surface of the band 2 without crowding or leaving objectionable spaces between coadjacent "shoes." Each "shoe" is provided with a downwardly and laterally-turned coupling lip 4 preferably constructed by cutting a suitably-shaped piece from the plate 3 and then bending it downwardly and laterally as shown in Fig. 1, to thereby form a coupling lip to engage over the lateral edge of the felly-band 2. The opposite side of the plate 3 is also provided with an inwardly-turned lip or lug 5 preferably formed by cutting a suitably-shaped piece from the plate 3 and then bending it inwardly. The distance between the coupling lip 4 or the lug 5 is sufficient to permit the placement of the shoe on the felly-band in the manner shown in Fig. 2 wherein the coupling lip 4 is engaged with one of the side edges of the band and the opposite side of the "shoe" is brought down into engagement with the outer face of the felly-band 2 to cause the lug 5 to lie in lapping engagement with the edge of the band 2 to thereby constitute means for preventing lateral shifting of the "shoe" on the band 2.

In practice I prefer to provide one side of the band 2 with a beveled portion 6 and to make the coupling-lip 4 with a space slightly less then the normal thickness of the band 2 so that when the parts are in position, as shown in Fig. 2, some degree of force will be required to bring the free end of the shoe carrying the lug 5 down on to its seat on the band 2 and thereby set up frictional engagement between the coupling-lip 4 and the band 2 to prevent looseness or jarring when the wheel is being used. The ends of the "shoe" are provided with registering semi-circular openings 7 which are arranged to also register with similar openings extending in the band 2 and felly 1 through which are passed hold-fast devices 8 for clamping the "shoes" onto the faces of the rim.

Each of the "shoes" is provided with an outwardly-projecting flange 9 to constitute holding means for supporting tire-forming blocks of resilient material but as the size, shape and conformation of these are immaterial a further description is believed to be unnecessary.

I claim:

The combination with a felly-band of a vehicle wheel provided with lateral extensions, of a plurality of tire-block-carrying shoes arranged on the periphery of said band and each provided with an inwardly and laterally-extending integral coupling-lip engaging over one of the lateral projecting portions of the felly-band, the opposite side portion of the inner faces of said shoes provided with inwardly-projecting lugs adapted to lap the opposite edge of the band for connecting the shoe therewith, each of said tire-forming blocks provided with openings registering with suitable openings in said felly-band to receive hold-fast devices for clamping the shoes onto said band and prevent lateral movement thereof.

In testimony whereof I have hereunto set my hand in presence of two subscribing witnesses.

BENJAMIN C. SWINEHART.

Witnesses:
C. E. HUMPHREY,
A. L. MCCLINTOCK.

---

Copies of this patent may be obtained for five cents each, by addressing the "Commissioner of Patents, Washington, D. C."